United States Patent [19]

Pareja

[11] Patent Number: 4,732,175
[45] Date of Patent: Mar. 22, 1988

[54] SURGE SUPPRESSOR

[75] Inventor: Ramon Pareja, Edina, Minn.

[73] Assignee: Hypro Corp., St. Paul, Minn.

[21] Appl. No.: 69,194

[22] Filed: Jul. 2, 1987

Related U.S. Application Data

[62] Division of Ser. No. 939,010, Dec. 8, 1986, Pat. No. 4,782,584.

[51] Int. Cl.⁴ .............................................. F16L 55/04
[52] U.S. Cl. ......................................... 138/30; 138/26
[58] Field of Search ........................... 138/26, 30, 32; 220/85 B

[56] References Cited

U.S. PATENT DOCUMENTS

| | | | |
|---|---|---|---|
| 2,841,180 | 7/1958 | Pier | 138/30 |
| 3,625,242 | 12/1971 | Ostwald | 138/30 |
| 3,766,992 | 10/1973 | Tiraspolsky et al. | 138/30 |
| 4,186,775 | 2/1980 | Muroi | 138/26 |
| 4,600,035 | 7/1986 | Sugimura | 138/26 |

FOREIGN PATENT DOCUMENTS 1249197 10/1971 United Kingdom ................ 138/30

Primary Examiner—Henry J. Recla
Assistant Examiner—L. J. Peters
Attorney, Agent, or Firm—Orrin M. Haugen; Thomas J. Nikolai; Frederick W. Niebuhr

[57] ABSTRACT

A surge suppressor for dampening undesired pressure surges in a fluid handling system and using a tubular, elastomeric diaphragm disposed in a hollow chamber of a housing to separate the chamber into two isolated zones, one being exposed to the fluid exhibiting undesired pressure surges and the other being pressurized with a compressible fluid. This arrangement obviates problems caused by wrinkling or folding of the generally planar diaphragm used in prior art pulsation dampeners.

6 Claims, 3 Drawing Figures

SURGE SUPPRESSOR

This is a divisional of application Ser. No. 06/939,010, filed Dec. 8, 1986; now U.S. Pat. No. 4,782,584.

BACKGROUND OF THE INVENTION

I. Field of the Invention

This invention relates generally to devices for reducing pressure pulsations in fluid handling systems and more particularly to a new design of such a pulsation dampener whereby the life of the diaphragm used therein is extended and the overall complexity of the device is reduced.

II. Discussion of the Prior Art

Various forms of surge suppressors or pulsation dampeners are known in the art. In general, they comprise a rigid housing defining a cavity containing a partition made from an elastomeric material which seals one portion of the cavity from the other. Provision is made to allow the working fluid subject to pressure surges to enter one compartment while the other compartment is pressurized with a compressible fluid. Typical prior art arrangements are shown in the Burton U.S. Pat. No. 4,186,776, the Porel U.S. Pat. No. 4,603,711 and the Wirth et al U.S. Pat. No. 4,201,246. Each of the devices depicted in those patents suffers from a common defect. Specifically, the elastomeric diaphragm used to separate the working fluid from the pressurized chamber is subjected to repeated flexing and folding proximate the location where the diaphragm is secured to the housing or where the diaphragm is designed to invert upon shifts in pressure on opposed sides of the diaphragm. When it is considered that such pulsation dampeners or surge suppressors are intended to be used with positive displacement fluid pumps operating at high speeds and at elevated pressures, the rapid flexures of the diaphragm, including reverse bending thereof, at the above-mentioned wear points results in premature failure.

The prior art also addresses various ways of attempting to deal with this problem. For example, the bladder or diaphragm may be reinforced or contoured so as to bend or invert in a specific fashion intended to reduce the radius of curvature of the diaphragm at the point of inversion. For example, in the Burton U.S. Pat. No. 4,186,776 patent, the diaphragm is provided with an annular lip 22c for controling the bending of the diaphragm and the diaphragm is provided with a bridging disk 34 to preclude the diaphragm from becoming extruded into the inlet when the pressure in the chamber 14 exceeds the pressure in the chamber 24. Notwithstanding the provision of these features, the planar diaphragm is still subjected to significant flexures which result in molecular heating due to friction and relatively rapid failure, thus requiring frequent replacement. Also, frictional rubbing and attendant heating of the diaphragm occurs due to contact between the diaphragm on its surrounding housing.

It is a purpose of the present invention to obviate these problems while creating a surge suppressor which not only exhibits an extended mean-time-between-failure, but which is more simple in its construction than prior art systems, thus reducing its overall cost and simplifying repair when they do become necessary.

SUMMARY OF THE INVENTION

In accordance with the present invention, there is provided a surge suppressor which includes a housing defining a cavity. Disposed in the cavity is a rigid baffle member which is generally tubular in the geometry and which is coaxially aligned with the housing's inlet opening through which the fluid subject to undesired pressure surges passes. The tubular wall portion of the rigid baffle includes a plurality of longitudinally spaced radially extending slots through which the working fluid may flow. Surrounding the baffle, yet contained within the cavity of the housing is a generally tubular bladder member formed from an elastomeric material. The bladder is sealed at its opposed ends between the baffle member and the housing, the bladder acting as a barrier isolating the working fluid from a pressurized portion of the chamber containing a compressible fluid, such as nitrogen.

The pressurized chamber filled with the pressurizing gas typically exhibits a pressure approximately one-half that of the working pressure of the fluid being pumped or otherwise handled. When pressure surges occur in the system, the tubular walls of the diaphragm bulge and contract, but because of the presence of the baffle, the diaphragm does not invert or fold anytime during its working cycle. Furthermore, the bladder does not rub against the housing. This results in much less wear to the diaphragm and provides a pulsation dampener exhibiting a much longer working life than known prior art systems.

A further advantage of the present invention is that the active surface area of the tubular diaphragm in the present invention can be made substantially greater for a given size housing than when the flat bladder of the prior art is used, thus allowing for a more compact design.

OBJECTS

It is accordingly a principal object of the present invention to provide a new and improved surge suppressor for fluid handling systems.

Another object of the invention is to provide a surge suppressor of the type including an elastomeric diaphragm, but where the diaphragm is configured and supported so as not to fold or wrinkle during its operating cycle.

Still another object of the invention is to provide a pulsation dampener which is inexpensive to manufacture and which exhibits a significantly extended mean-time-between-failure parameter than known prior art devices designed for a similar purpose.

A yet further object of the invention is to provide a pulsation dampener having a generally tubular outer housing defining a cavity containing a concentrically disposed internal baffle and a surrounding tubular shaped diaphragm whereby the diaphragm is supported by the baffle when the pressure of the working fluid is low compared to the pressure maintained in the chamber or compartment filled with the pressurizing gas.

DESCRIPTION OF THE DRAWINGS

These and other objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
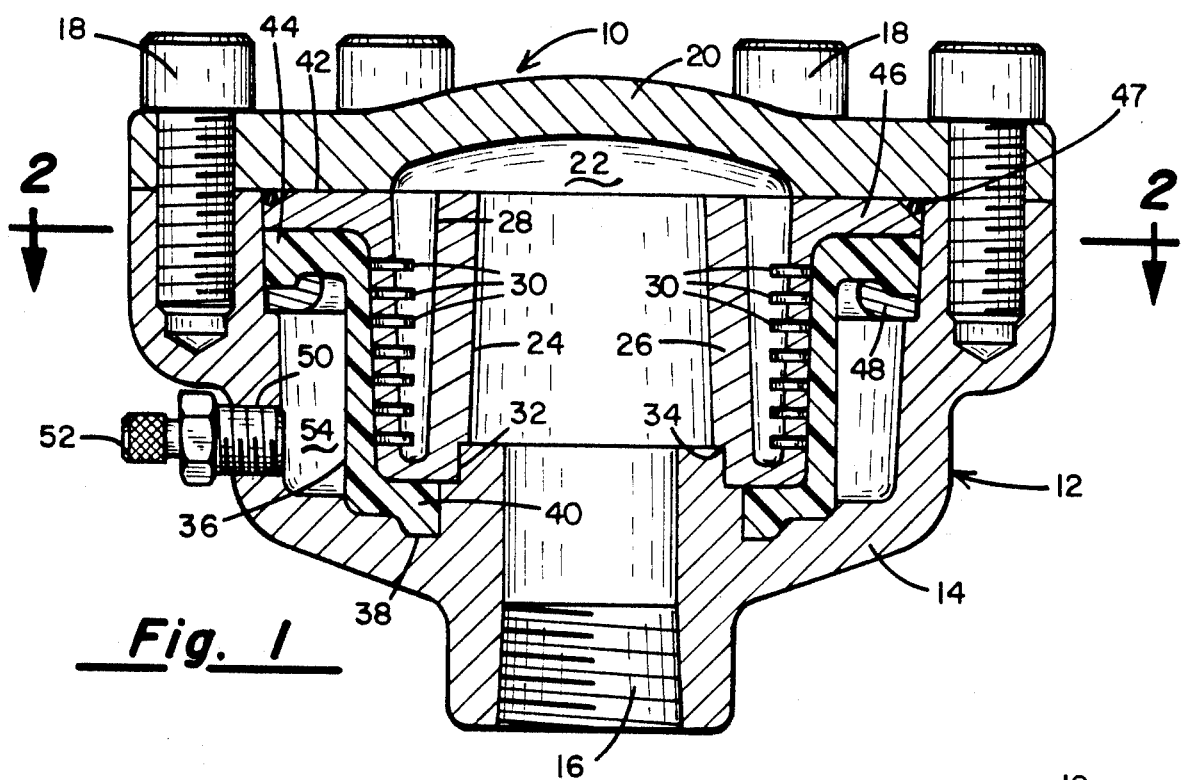
FIG. 1 is a cross-sectional view of a first preferred embodiment showing the internal construction thereof.

Referring first to FIG. 1, there is indicated generally by numeral 10 a pulsation dampener made in accordance with the present invention. The pulsation dampener 10 is seen to include an outer rigid housing 12 including a bell-shaped dome member 14 having a threaded fluid inlet port 16. Affixed to the bell housing 14 by bolts or cap screws 18 is a cover plate 29. The bell housing 14 and the cover plate 20 may be molded from metal or possibly fabricated from a suitably plastic material of sufficient rigidity so as to resist flexure when exposed to the pressure impulses which the device is intended to suppress.

As can be seen from FIG. 1, the bell housing 14 and the cover plate 20 define an internal hollow chamber 22 which is in fluid communication with the inlet port 16. Located within the hollow chamber 22 is a generally rigid baffle member indicated generally by numeral 24. It is seen to include a generally cylindrical tubular wall segment 26 coaxially aligned with the fluid inlet port 16 in the housing. Referring to both FIGS. 1 and 2, it can be seen that the baffle member 24 includes a plurality of radially spaced bores 28 which extend longitudinally inwardly into the cylindrical wall 26, the bores 28 preferably being tapered as shown. It may also be observed from the cross-sectional view of FIG. 1 that the length of the bores 28 is less than the length of the tubular wall 26 and, hence, does not penetrate the bottom edge of the baffle member 24, "bottom" referring to the orientation of the parts when viewed in FIG. 1. The tapered bores 28 are exposed to the working fluid contained within the hollow chamber 22 in that the upper end of the baffle does not abut and become sealed to the cover plate 20. Furthermore, and as can be seen from FIG. 1, the cylindrical tubular wall includes a plurality of longitudinally spaced, radially extending slits 30 formed through its exterior surface with these slits 30 intersecting with and providing fluid communication through the vertical bores 28.

The bottom portion of the tubular rigid baffle 26 is provided with an annular groove 32 which coax with a shoulder 34 formed on the interior of the housing bell member 14 for concentrically seating the baffle member 24 with respect to the inlet port 16 when the cover plate 20 is bolted in place. The baffle 26 may be fabricated from a suitable metal or plastic, the choice depending somewhat on the nature of the fluid to be pumped. In one embodiment, the baffle has been molded from Glas F Polypropylene, but limitation thereto is not intended.

Also contained within the hollow chamber 22 of the housing 12 is a generally tubular diaphragm member 36 exhibiting a desired stress/strain and recovery property. With no limitation intended, in a pulsation dampener constructed in accordance with the present invention, the diaphragm 36 was fabricated from 70 durometer Buna-N material and has a wall thickness of approximately ⅛th inch. With reference to FIG. 1, the lower end portion 38 of the diaphragm 36 is molded to provide an inwardly extending flange 40 which lies beneath the lower end surface of the rigid baffle member 26. The upper end 42 of the diaphragm 36 has an integrally molded, outwardly extending flange 44 which underlies the outwardly extending flange 46 formed on the rigid baffle member 26. A clamping ring 48 is provided to engage the undersurface of the diaphragms's flange 44 causing the flange to be securely clamped and sealed when the cover member 20 is assembled and held in place by the bolts 18. By providing the flanges 40 and 44, the diaphragm may be clamped and sealed without need for O-rings or the like between mating surfaces. It is advantageous to include an "O" ring seal 47 between the cover member 20, the flange 46 and the dome 14 to preclude fluid leakage between those mating parts.

Formed through the side wall of the bell housing member 14 is an internally threaded bore 50 into which is fitted an inflation in-line check valve 52 which allows a gas, under pressure, to be introduced into the annular compartment 54 defined by the interior wall of the bell housing 14 and the exterior wall of the tubular diaphragm member 36. The interior wall of the diaphragm 36 is exposed to the working fluid entering the inlet port 16 and filling the hollow chamber 22 by virtue of the longitudinal bores 28 and the spaced-apart slits 30.

In operation, the chamber 54 is pressurized with a suitable compressible fluid, such as nitrogen gas, to a predetermined pressure in the neighborhood of one-half of the pressure of the working fluid. When the pulsation dampener is used in conjunction with a multi-cylinder, positive displacement fluid pump, upon each piston stroke, a pressure surge is created causing the tubular walls of the diaphragm 36 to bulge and contract in synchronism with the pressure and suction strokes of the pump. Because of the manner in which the diaphragm is captured in the pulsation dampener housing and supported on the suction phase by the rigid baffle member 24, the diaphragm expands and contracts without creasing, folding or contacting the surrounding housing. Thus, the internal heating of the elastomeric material due to molecular friction is substantially reduced as compared to the above-described prior art surge dampener designs. The surge dampener illustrated in the embodiments of FIGS. 1 and 2 may be coupled to the fluid handling system by screwing the threaded inlet port 16 onto a suitable pipe nipple which, in turn, is appropriately joined to the fluid handling system in a known manner.

ALTERNATIVE EMBODIMENT—FIG. 3

Figure 2:
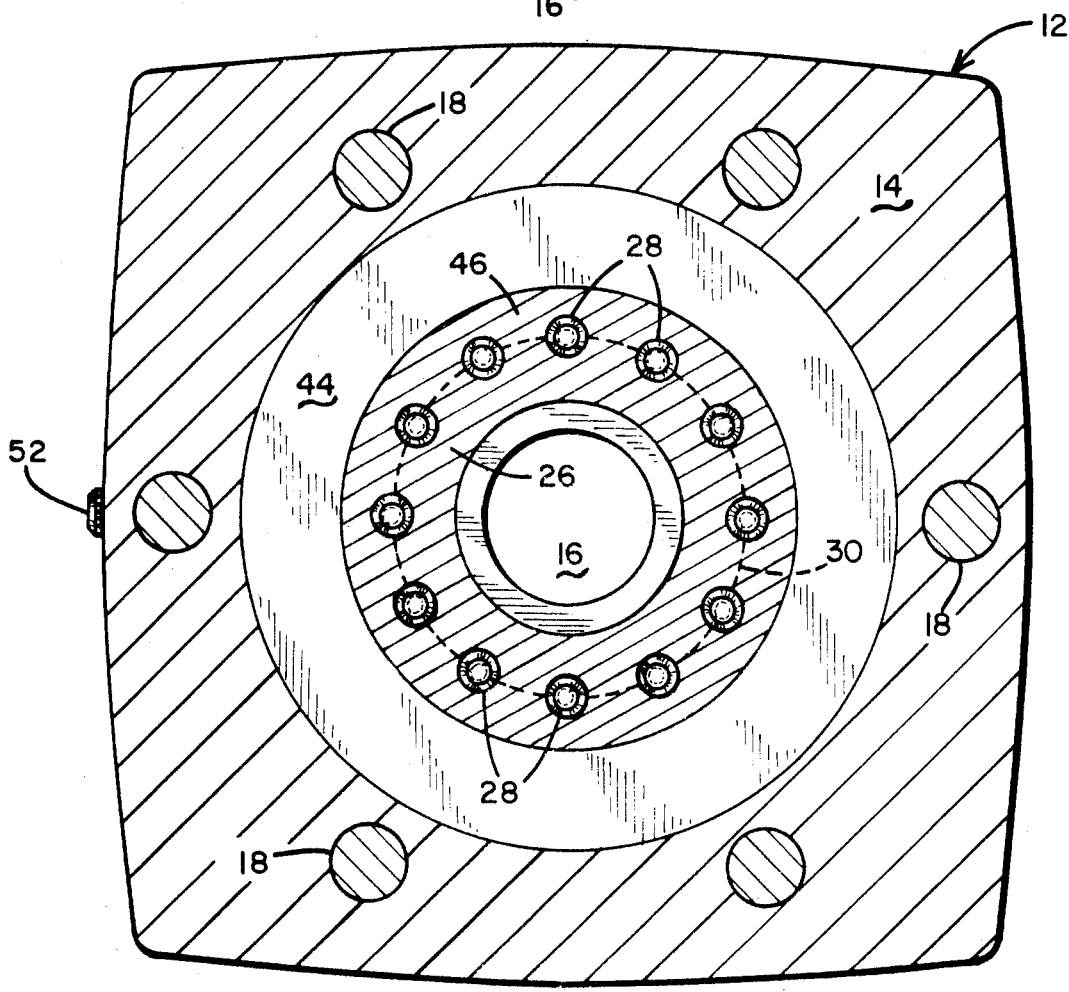
FIG. 2 is a cross-sectional view taken along the lines 2—2 in FIG. 1.
Figure 3:
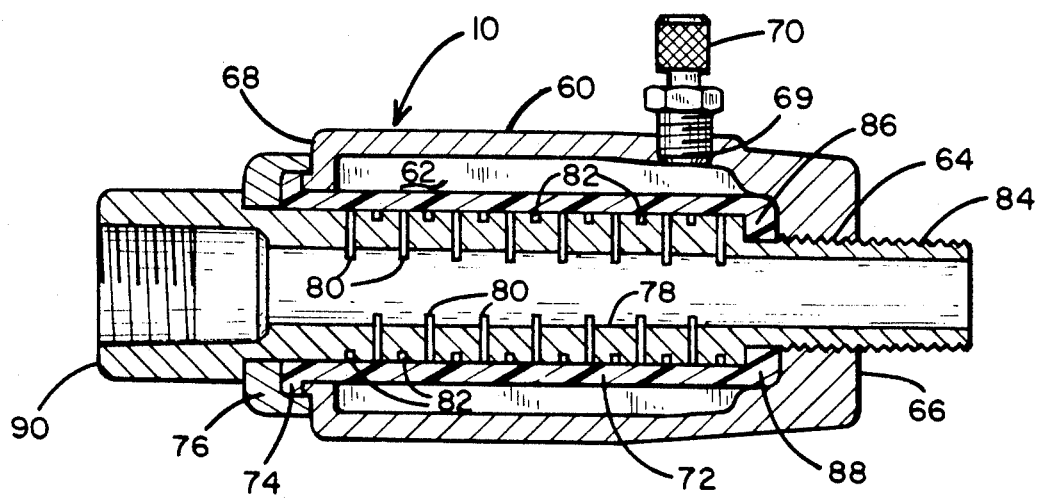
FIG. 3 is a cross-sectional view of an alternative embodiment of the invention.

The cross-sectional view of FIG. 3 illustrates an alternative implementation of the present invention allowing the pulsation dampener to be disposed, in-line in the fluid handling system rather than off-line as in the case of the embodiment of FIGS. 1 and 2. The surge suppressor in accordance with the embodiment of FIG. 3 includes a generally tubular housing 60 formed from a rigid, non-expandable metal or plastic defining a cavity 62 therein. The housing body 60 is somewhat elongated and is provided with a first internally threaded bore 64 at a first (distal) end 66 thereof and an opening at a second (proximal) end 68 thereof. Extending through the side wall of the tubular body 60 is a second internally threaded bore 69 into which is fitted an inflation check valve 70. The outlet of the check valve 70 communicates with the cavity 62.

Coaxially disposed within the cavity 62 is a tubular bladder member 72 which, too, is formed from a suitable elastomeric material, such as Buna-N having a predetermined durometer and elastic properties. The tubular diaphragm 72 has an outwardly extending flange 74 at its proximal end and fitted about this flange is a clamping ring 76.

Inserted through the clamping ring 76 and through the tubular body 60 of the housing is a generally tubular baffle member 78. Spaced longitudinally along the tubular baffle member are radially extending slots 80 which extend completely through the side wall of the tubular baffle. Formed inwardly from the exterior surface of the tubular baffle 78 and generally disposed between each of the radial slits 80 are annular groove 82.

The distal end 84 of the baffle 78 is equipped with external threads adapted to mate with the internal thread 64 of the housing allowing the baffle member to be screwed into the housing. It may also be noted that the tubular baffle member is provided with a shoulder 86 which is arranged to cooperate with an internally directed flange 88 integrally formed on the distal end portion of the tubular bladder or diaphragm member 72. Thus, when the baffle member 78 is firmly screwed into position, the opposed ends 74 and 88 of the tubular bladder 72 are captured between the housing 60 and the baffle member, thus providing a fluid tight seal at each end thereof.

The pulsation dampener or surge suppressor of FIG. 3 is arranged to be disposed in a serial flow path in the fluid handling system with which it is to be used. For example, the proximal end 90 of the surge suppressor 10 may be threaded onto the outlet port of a positive displacement pump (not shown) while the distal end 84 thereof may be coupled to a fluid receiving device, such as a valve-controlled outlet sprayer device, or the like. Once the portion of the chamber or cavity 62 surrounding the exterior wall of the diaphragm 72 is pressurized with a compressible fluid, and the pump is turned on, the working fluid being pumped will flow through the inlet end 90 of the surge suppressor 10 and through the longitudinally spaced, radially extending slots 80 to cooperate with the interior surface of the diaphragm 72. The radial grooves 82 are provided to spread the pressurized fluid over the entire interior surface of the diaphragm or bladder 72. When the outlet device is suddenly shut off, a pressure surge occurs tending to swell the tubular bladder 72 against the counteracting pressure exerted by the compressible fluid on the opposite side of the bladder.

It is apparent from the drawing of FIG. 3 that the baffle member 78 supports the diaphragm when the pressure of the working fluid is less than the pressure of the gas contained within the annular cavity and that when the working pressure of the fluid being handled exceeds the gas pressure, the diaphragm will bulge, but cannot wrinkle, invert or rub against the housing or the baffle. Again, this prolongs the life of the diaphragm significantly when compared to prior art designs.

The foregoing disclosure and description of the invention are illustrative and explanatory thereof, and various changes in the size, shape and materials as well as in the details of the illustrated construction may be made without departing from the spirit of the invention.

What is claimed is:

1. A surge suppressor for suppressing undesired pressure surges in a fluid handling system, comprising:

(a) a unitary tubular housing having a generally open end and a generally closed end, said closed end having an internally threaded bore extending through it, said housing defining a tubular cavity;
    (b) a rigid, generally tubular baffle member coaxially disposed in said cavity and having a tubular wall portion longitudinally aligned with said generally open end and said generally closed end of said tubular housing said tubular baffle extending through said tubular housing at each end of said housing and of a length greater than the length of said housing, said tubular wall portion including a plurality of longitudinally spaced, radially extending slots formed through said wall portion and having a one-piece integrally formed, externally threaded tubular stub at one end thereof mating with said internally threaded bore;
    (c) a tubular bladder member formed from an elastomeric material coaxially disposed about said baffle member and clamped at each end between said baffle member and said housing to form a fluid tight seal proximate each end of said tubular bladder member when said externally threaded stub is mated with said internally threaded bore to effectively divide said cavity into two chambers, one chamber being exposed to said fluid subject to said undesired pressure surges; and
    (d) means for pressurizing the other chamber with a compressible fluid to a predetermined pressure.

2. The surge suppressor as in claim 1 wherein said housing comprises a rigid, non-expansible, elongated body defining said cavity and having a first internally threaded bore at a first end thereof, an opening at a second end thereof and a second internally threaded bore extending through a side wall of said elongated body.

3. The surge suppressor as in claim 2 and further including an inflation, in-line check valve screwed into said second internally threaded bore.

4. The surge suppressor as in claim 2 wherein said rigid baffle member comprises an elongated tubular body of a rigid, non-expansible material defining said wall portion and of a length greater than the length of said elongated body of said housing and of an outside dimension capable of fitting through said opening at said second end of said elongated body of said housing and into said cavity, one end of said tubular body of said baffle member being externally threaded so as to be received by said first internally threaded bore in said body of said housing.

5. The surge suppressor as in claim 4 wherein said tubular bladder member coaxially surrounds a portion of said tubular body member of said baffle member within said cavity and has first and second integrally formed end flange segments which become squeezed in sealing relation with said housing and with said rigid baffle member when said externally threaded end of said baffle member is screwed into said first internally threaded bore of said body of said housing.

6. The surge suppressor as in claim 5 and further including a clamping ring surrounding one of said first and second flanges with the other end of said bladder being wedged between said baffle member and said body of said housing.

* * * * *

UNITED STATES PATENT AND TRADEMARK OFFICE
CERTIFICATE OF CORRECTION

PATENT NO. : 4,732,175

DATED : March 22, 1988

INVENTOR(S) : Ramon Pareja

It is certified that error appears in the above-identified patent and that said Letters Patent is hereby corrected as shown below:

Column 6, line 15, after "one-piece" insert a comma -- , --.
Column 6, line 59, delete "of said body" (first occurrence).

Signed and Sealed this

Thirtieth Day of August, 1988

*Attest:*

DONALD J. QUIGG

*Attesting Officer*  *Commissioner of Patents and Trademarks*